United States Patent
Hanna

(10) Patent No.: US 7,856,089 B2
(45) Date of Patent: Dec. 21, 2010

(54) METHOD AND APPARATUS FOR CONTROL LOCKOUT AND TRANSFER DURING SERVICE FOR SYSTEMS CONTROLLED BY MULTIPLE DEVICES

(75) Inventor: Stephen Dale Hanna, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1426 days.

(21) Appl. No.: 11/088,132

(22) Filed: Mar. 23, 2005

(65) Prior Publication Data

US 2006/0217992 A1    Sep. 28, 2006

(51) Int. Cl.
*H04M 11/00* (2006.01)

(52) U.S. Cl. ............... 379/90.01; 379/910; 379/100.01; 399/11; 399/9

(58) Field of Classification Search ................ 379/910, 379/100.01–100.07, 90.01, 93.05, 93.06; 358/1.14, 1.15; 399/11, 15, 8, 9
See application file for complete search history.

(56) References Cited

U.S. PATENT DOCUMENTS

| | | | |
|---|---|---|---|
| 4,452,136 A | 6/1984 | Boynton et al. | 101/93.05 |
| 5,243,382 A * | 9/1993 | Takano et al. | 399/8 |
| 6,467,054 B1 | 10/2002 | Lenny | 714/42 |
| 6,473,788 B1 * | 10/2002 | Kim et al. | 709/209 |
| 6,529,286 B1 * | 3/2003 | King | 358/1.14 |
| 2002/0056015 A1 * | 5/2002 | Nakai et al. | 710/18 |
| 2003/0030842 A1 | 2/2003 | Suyehira | 358/1.15 |
| 2003/0049034 A1 * | 3/2003 | Inui et al. | 399/11 |
| 2004/0120722 A1 * | 6/2004 | Braun et al. | 399/8 |

FOREIGN PATENT DOCUMENTS

JP    6195236 A    3/1994

\* cited by examiner

*Primary Examiner*—Melur Ramakrishnaiah
(74) *Attorney, Agent, or Firm*—Duft Bornsen & Fishman LLP

(57) ABSTRACT

A printer, fax machine, copier, scanner, or any other office device used by multiple users from multiple locations is provided with improved apparatus and/or software for locking out all incoming commands from reaching the device's internal controller except for commands coming from a newly-designated primary controller used by the service technician. This lockout can be used with any type of office machine that has it's own internal controller, so it applies equally to all types of office machines and systems generally used in today's office environments.

18 Claims, 2 Drawing Sheets

METHOD AND APPARATUS FOR CONTROL LOCKOUT AND TRANSFER DURING SERVICE FOR SYSTEMS CONTROLLED BY MULTIPLE DEVICES

FIELD OF THE INVENTION

This invention relates to office machine systems and computers generally and more specifically to office machines such as printers, faxes, copiers, scanners or controllers thereof, particularly where such machines have multiple control inputs from multiple sources or users. An improved apparatus and method of locking out interfering commands or requests to the machine from users when a service person is engaged in service mode operations on the machine is disclosed.

BACKGROUND OF THE INVENTION

Computer systems and office machine systems are commonly linked together in a network that may be wired or wirelessly implemented so that multiple users can all access the facilities of various office machines such as printers, faxes, copiers, scanners, and the like from their desktop or laptop computers. Typically, using the printer as an example, multiple users will wish to send printing tasks to the commonly-shared printer for printing. Modern high-speed office and production printers have been developed that can easily handle the throughput required to support a large number of users virtually simultaneously. Such machines require detailed expert service to maintain peak operational capacity. During service times, either the service technician must manually disable the inputs to the machine from users, such as by disconnecting the interface cables, or must entirely remove the machine from service in the system. This is referred to as "going offline". Operations for diagnostic purposes often require the technician to move about the machine and to enter control commands from various physical locations while tests are being performed This can be cumbersome and time-consuming and inconvenient as well, especially on large-sized, high-speed printer systems.

One such high-speed printer system, for example, is the Model 4100 printer, available from International Business Machines Corporation, Armonk, N.Y. Such a printer is capable of printing in duplex, that is, on both sides of paper, for production printing at rates up to 1220 impressions per minute, where impressions are defined as being one 8.5"×11" content printed on a sheet of paper. Such machines are typically approximately twenty to forty feet long, or longer depending on what paper feeding, collecting, collating or other apparatus may be provided with them. This means that service operations require a good deal of physical movement about the machine on the part of the service technician to inspect operation, make adjustments, enter test commands or to observe indicators. Typically, such printers receive input printing tasks from a mainframe computer or printer server and from directly-attached networks of devices such as user's computers which may be connected using ESCON® (Trademark of IBM Corporation, Armonk, N.Y.) an optical channel attachment used with IBM mainframe computers, Ethernet, Ficon, an optical fiber channel connection, or other high-speed channel links. In such a system, incoming commands can be generated from a multitude of users, all of which would interfere with a service technician's tasks of diagnosing and correcting problems and the like. In fact, with the widespread use of wireless systems based on radio frequency, infra-red, optical or other types of communication network capabilities, it is almost inevitable that interference with the technician's task will result unless some means is provided that will enable the service person to control all the operations of the printer while simultaneously preventing any input commands from would-be users from reaching the printer.

What is desired is a special lockout apparatus and method that blocks incoming commands from the computer system, the print server or users while enabling control commands to be acted upon if they are from the service technician. Control over the operation of the device can be effectively transferred from the internal controller of the device to the service technician, who may carry a wireless hand-held computer, so long as the lockout apparatus and method are in use The "primary" control device then becomes the technician's handheld computer device and commands from the mainframe or server are ignored until service is ended and control is transferred back to the device's own controller.

SUMMARY OF THE INVENTION

In accordance with the principles of the invention, a printer, fax machine, copier, scanner, or any other modern communication-equipped office device used by multiple users from multiple locations is provided with improved apparatus and/or software that provides a lockout function to be invoked to block all incoming commands from reaching the device's internal controller except for those commands coming from a newly-designated primary controller used by the service technician. While the invention will be shown and described with reference to a preferred embodiment in the form of a high-speed printer, it should be easily understood by those of skill in the art that similar principles and apparatus can be used with any type of office machine that has it's own internal controller, so that the invention is in no way limited to just the field of printers generally, but applies equally to all types of office machines and systems.

BRIEF DESCRIPTION OF THE DRAWINGS

The foregoing and other objects and advantages of the invention will be appreciated more fully from the following further description thereof with reference to the accompanying drawings, wherein.

DETAILED DESCRIPTION OF ILLUSTRATIVE EMBODIMENT

Figure 1:
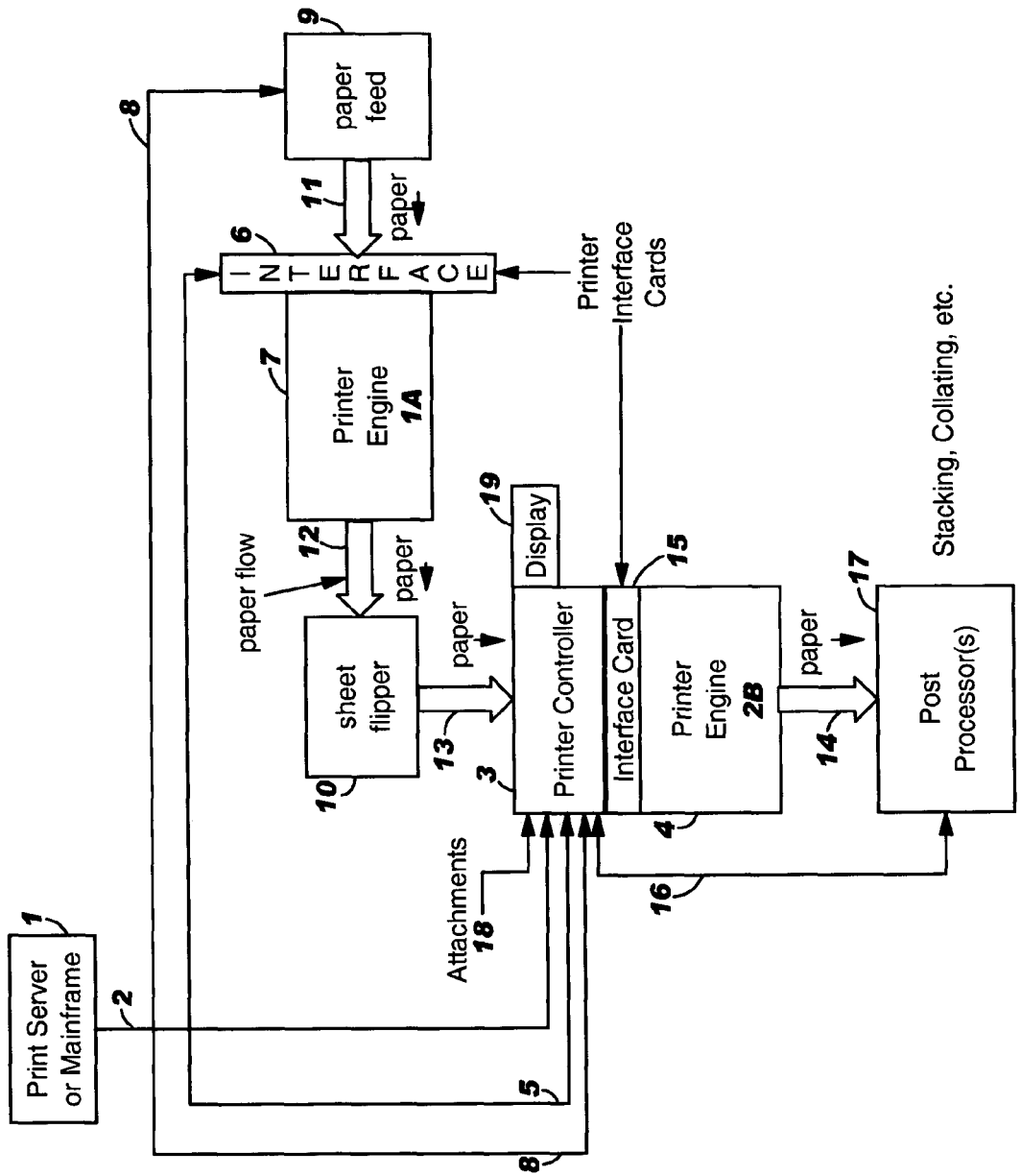
FIG. 1. Illustrates schematically the structure and main components of a modern high-speed duplex printing machine in which an embodiment of the invention can be implemented.

The invention will be detailed and described with reference to an exemplary high-speed printing machine system having an internal controller or controllers and a variety of high-speed incoming signal lines from mainframe computers, printer servers or communications links from networks of users who provide the printer with input data and commands for printing tasks. Shown in FIG. 1 is a brief schematic of an IBM Model 4100 Duplex Printer, details of which may be easily obtained from published sources such as IBM publication G544-5798, or S544-5800. These documents are available at IBM's Support and Maintenance website: http://www.printers.ibm.com/internet/wwsites.nsf/vwwebpublished/ip4100supt_ww PDF can be downloaded free and hardcopy can be ordered from that website or are available from the International Business Machines Corporation, Armonk, N.Y.

In FIG. 1, a printer server or mainframe computer 1 provides printer data and commands over line 2 to the printer controller 3 located in printer engine 4, which is the primary controller for the printer. There can be two channel attachments to mainframes, rather than just one. However, for simplicity of description, only one channel attachment is illustrated in FIG. 1. An interface card attached to the controller 3 allows the controller to select which source of input will be handled next by the printer 4. Because this illustration is for a duplex printer of the high-speed type, two separate, but linked and commonly controlled printer engines are employed, one for each side of a sheet of paper. Therefore, interlink control lines 5 and 8 interconnect bidirectionally the main printer controller 3 associated with printer engine 4 with the printer engine 7 and with the roll or sheet feed 9. Paper flows from feed 9 over path 11 to the printer engine 7 which receives the paper and, under the control of the controller 3 in printer engine 4 connected via bidirectional connection 5 to the interface card 6 in printer engine 7, data and control signals from the main controller 3 to print "first" side of the paper.

After printing the first side of the paper, printer engine 7 transfers the paper over path 12 to a sheet flipper 10 that turns the blank side of the paper in the proper direction to be printed upon in printer engine 4, which it feeds to printer engine 4 over path 13.

Printer engine 4 has an interface card 15 through which the printer controller 3 supplies the printer engine with print data for printing. Controller 3 may also advantageously have an associated data display device 19 through which it outputs informative data for a service person or system user regarding the status of printing jobs, machine conditions, error situations and the like. The printer controller 3 is also connected via bidirectional connection 16 to a post-processor 17, another controller, in charge of stacking, collating, or other paper-handling output functions for the printer system.

Direct input of data and control over high-speed optical or other attachments, including wireless communications inputs are indicated generally as attachments 18 which are connected to the controller 3 in printer engine 4. Any of the input sources, 1, 2 or 18 may, at any time, present commands and/or data for printing by the printer system. In this context, it is obvious that a service technician desiring to diagnose any system errors or mechanical problems must have a way to suspend operation of the printer controller, at least insofar as service to incoming print jobs is concerned, while diagnostic and service routines may be in effect. This invention facilitates such operation by effectively transferring control over the system's internal operations to the service technician who interfaces to the printer controller over an internal keypad (not shown in the Figures) or wirelessly from a handheld computer device inputting signals over one of the attachment interface connections, 18.

Suspension of operational control and transfer thereof to the service technician is achieved in the invention by signaling the printer controller 3 to lockout all inputs except those coming from the service technician. It does so by interlocking the interface cards 15 and 6 in printer engines 4 and 7, respectively, under control of an interlock mechanism that may be either hardware, firmware or software. In the preferred embodiment of the invention, the interlock is provided by a software method implemented in the controller 3 and invoked by the service technician entering an appropriate service mode command, which is detected by the controller 3 and passed as an indication of service mode invocation to the interlock routine which will be described next.

Figure 2:
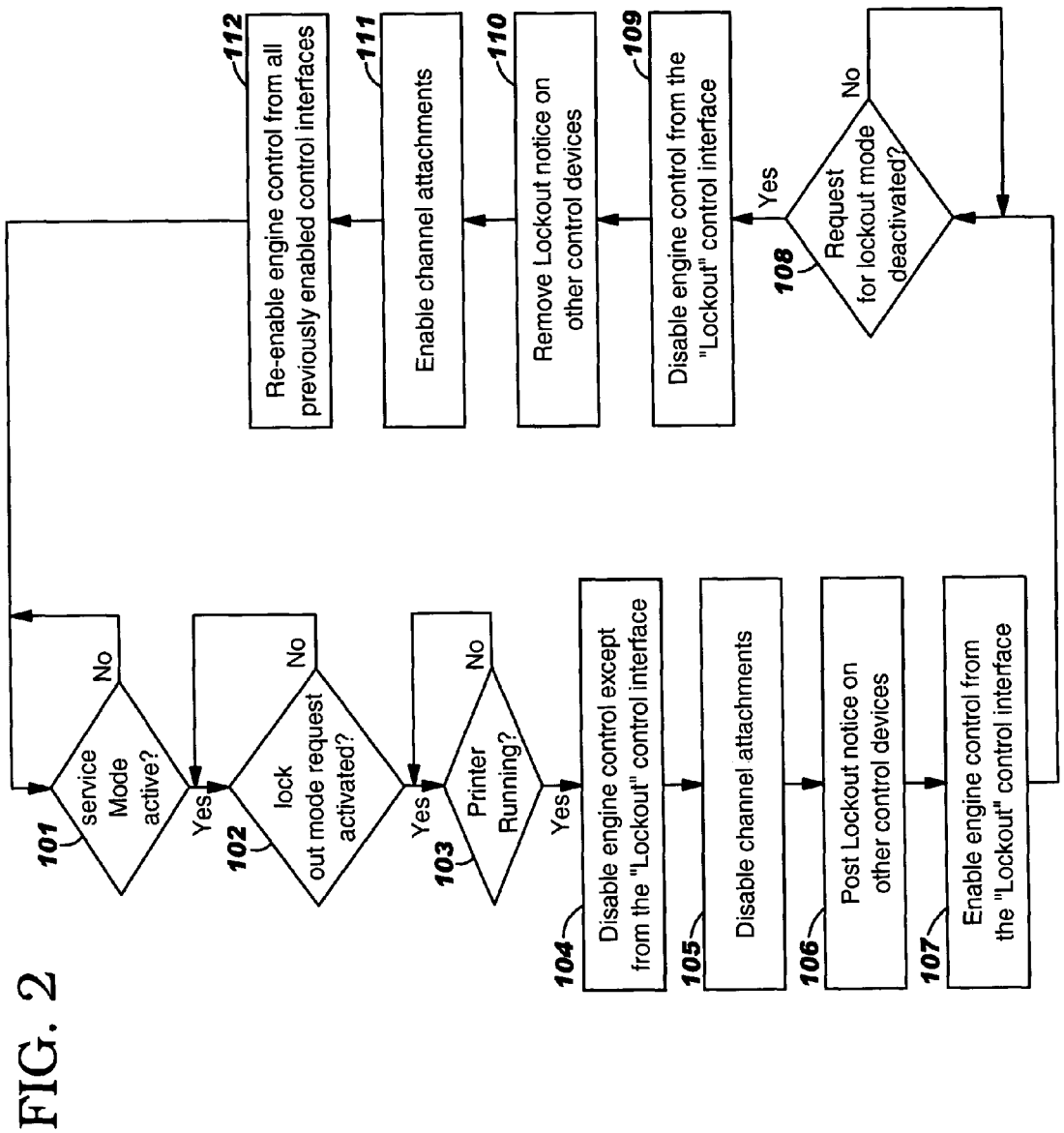
FIG. 2. Illustrates a logical flow diagram to be implemented in hardware, software or firmware or any combination of any thereof, for providing the lockout and control transfer and other functions in a preferred embodiment of the invention.

Turning to FIG. 2, a preferred embodiment of the lockout mechanism and its logical operation is detailed. In FIG. 2, the mechanism monitors for the input from a service technician to indicate that the technician wishes to enter the service mode. This is shown in block 101 where the mechanism monitors for the service mode active signal input by the service technician. If this signal is detected, a check is made in block 102 to determine whether the lockout mode is currently already invoked and, if not already invoked, it passes a signal to block 103 to determine whether the printer is currently running. If the printer is not currently running, i.e., in the process of printing a job, block 104 disables all engine control inputs except those from the service technician over the control interface connection 18 in FIG. 1. This effectively transfers control from controller 3 in FIG. 1, to the service technician, who may interface commands via the keypad or a handheld input device connected hard-wired or optically or radio-frequency or infra-red coupled to the controller 3. This results in block 105 of FIG. 2 disabling all channel attachments coming from devices other than the service technician's. A lockout notice is then posted to all other control devices associated with users of the printer system and with the other processors in the printer system itself, as shown in block 106. Printer engine control is then enabled in block 107 for inputs coming from the service control interface. Finally, in block 108, the lock out mode is monitored to determine if it is active until such time as the service technician terminates the service mode. When the technician is finished, the technician enters a command to end the lockout mode, which is detected in block 108 which passes an indication to block 109 disable the controller 3 from receiving commands over the lockout control interface. Then the mechanism, in block 110, removes the lockout notice posted in block 106 from the other controllers and user devices in the system. A signal is passed to block 111 to cause it to re-enable the channel attachments 18 in FIG. 1 and in block 112, to re-enable the engine controls active previously and disabled initially in block 104.

A software implementation of the above-described embodiment and techniques may comprise a series of computer executable instructions either fixed on a tangible medium, such as a computer readable media, e.g. diskette, a CD-ROM, a fixed disk, or flash memory in the technician's handheld device, etc., or such instructions may be transmitted to the system via any usual communications medium over suitable adapters to networks, and the like. The series of computer executable instructions embodies all or part of the functionality as illustrated in the drawings and previously described herein with respect to the invention. Those skilled in the relevant art will readily appreciate that such computer instructions can be written in a number of programming languages for use with many computer architectures or operating systems. Further, such instructions may be stored using any memory technology, present or future, including but not limited to, semiconductor, magnetic, optical or other memory devices or transmitted using any communications technology, present or future, including but not limited to optical, infrared, microwave or other transmission technology. It is contemplated that such a computer program product may be distributed as a removable medium with accompanying printed or electronic documentation, e.g. shrink-wrapped software, pre-loaded with a computer system or diagnostic device to be used by the service technician, or distributed from a server or electronic bulletin board over a network such as the Internet or World Wide Web.

Although an exemplary embodiment of the invention has been disclosed and described in detail above, it will be apparent to those skilled in the art that various changes and modifications can be made which will achieve all or some of the advantages of the invention without departing from the spirit and scope of the invention. It will be obvious to those reasonably skilled in the art that the disclosed apparatus, methods, programs and techniques may be achieved in all-software implementations, hybrid implementations which utilize combinations of hardware logic and software logic, or in all hardware logic to achieve the same results. Wherefore, what is set forth in the claims which follow is by way of illustration and not of limitation.

What is claimed is:

1. A printer comprising:
a host interface operable to receive print jobs from a user;
a print controller; and
a service interface operable to monitor for a service mode activation signal from a service technician, and further operable to provide the service mode activation signal to the print controller in response to receiving the service mode activation signal from the service technician,
wherein the print controller is operable to disable the host interface to block the reception of the print jobs from the user in response to receiving the service mode activation signal from the service interface, to notify the user that the host interface is disabled, and to enable control of the printer through the service interface by the service technician.

2. The printer of claim 1 wherein:
the service interface is further operable to terminate providing the service mode activation signal to the print controller in response to determining that the service technician has terminated the service mode activation signal, and
the print controller is further operable to enable the host interface to receive the print jobs from the user in response to the termination of the service mode activation signal, and to disable control of the printer through the service interface.

3. The printer of claim 2 wherein the print controller is further operable to notify the user that the host interface is enabled in response to the termination of the service mode activation signal.

4. The printer of claim 1 wherein the service interface comprises a keypad operable to receive the service mode activation signal from the service technician.

5. The printer of claim 1 wherein the service interface comprises a wireless interface operable to receive the service mode activation signal from a device external to the printer.

6. The printer of claim 1 wherein the print controller is further operable to ignore the service mode activation signal while the print controller is processing the print jobs from the user.

7. A method operable on a print controller of a printer, the method comprising:
monitoring a host interface of the printer for print jobs from a user;
monitoring a service interface of the printer for a service mode activation signal from a service technician; and
responsive to receiving the service mode activation signal from the service interface, disabling the host interface to block the reception of the print jobs from the user, notifying the user that the host interface is disabled, and enabling control of the printer through the service interface by the service technician.

8. The method of claim 7 further comprising:
determining that the service technician has terminated the service mode activation signal; and
responsive to the termination of the service mode activation signal, disabling the control of the printer through the service interface, and enabling the host interface to receive the print jobs from the user.

9. The method of claim 8 further comprising:
notifying the user that the host interface is enabled in response to the termination of the service mode activation signal.

10. The method of claim 7 wherein monitoring the service interface further comprises:
monitoring a keypad of the printer for the service mode activation signal from the service technician.

11. The method of claim 7 wherein monitoring the service interface further comprises:
monitoring a wireless interface of the printer for the service mode activation signal from a device external to the printer.

12. The method of claim 7 further comprising:
determining that the print controller is processing the print jobs from the user; and
ignoring the service mode activation signal in response to the determination.

13. A computer readable medium tangibly embodying programmed instructions which, when executed by a print controller of a printer, are operable for performing a method, the method comprising:
monitoring a host interface of the printer for print jobs from a user;
monitoring a service interface of the printer for a service mode activation signal from a service technician; and
responsive to receiving the service mode activation signal from the service interface, disabling the host interface to block the reception of the print jobs from the user, notifying the user that the host interface is disabled, and enabling control of the printer through the service interface.

14. The computer readable medium of claim 13, wherein the method further comprises:
determining that the service technician has terminated the service mode activation signal; and
responsive to the termination of the service mode activation signal, disabling the control of the printer through the service interface, and enabling the host interface to receive the print jobs from the user.

15. The computer readable medium of claim 14, wherein the method further comprises:
notifying the user that the host interface is enabled in response to the termination of the service mode activation signal.

16. The computer readable medium of claim 13, wherein the method further comprises:
monitoring a keypad of the printer for the service mode activation signal from the service technician.

17. The computer readable medium of claim 13, wherein the method further comprises:
monitoring a wireless interface of the printer for the service mode activation signal from a device external to the printer operated by the service technician.

18. The computer readable medium of claim 13, wherein the method further comprises:
determining that the print controller is processing the print job from the user; and
ignoring the service mode activation signal responsive to the determination.

* * * * *